(12) United States Patent
Betts (10) Patent No.: US 7,603,965 B1
(45) Date of Patent: Oct. 20, 2009

(54) LIVESTOCK PANEL COVER

(76) Inventor: Lane Betts, P.O. Box 554, Kiowa, CO (US) 80117

( * ) Notice: Subject to any disclaimer, the term of this patent is extended or adjusted under 35 U.S.C. 154(b) by 0 days.

(21) Appl. No.: 12/057,751

(22) Filed: Mar. 28, 2008

Related U.S. Application Data (63) Continuation-in-part of application No. 11/291,474, filed on Dec. 1, 2005, now abandoned.

(51) Int. Cl.
*A01K 1/00* (2006.01)
*A01K 15/04* (2006.01)

(52) U.S. Cl. .................. 119/524; 119/516; 256/24; 256/73

(58) Field of Classification Search .................. 119/502, 119/510, 512, 516, 519, 523, 524, 504, 506, 119/507, 513, 514, 522; 160/368.1, 371, 160/90, 96, 106; 256/24, 73, 1; 5/663; 428/99
See application file for complete search history.

(56) References Cited

U.S. PATENT DOCUMENTS

| | | | |
|---|---|---|---|
| 3,044,078 A * | 7/1962 | Hamilton | ................ 5/100 |
| 3,479,760 A | 11/1969 | Snyder | |
| 4,048,959 A | 9/1977 | Steele | |
| 4,193,584 A | 3/1980 | Wieser | |
| 4,359,792 A | 11/1982 | Dale | |
| 4,576,364 A * | 3/1986 | O'Fearna | ................ 256/24 |
| 4,619,223 A | 10/1986 | Koehn | |
| 4,793,286 A | 12/1988 | Buxton | |
| 4,852,194 A | 8/1989 | Langan | |
| 4,976,221 A | 12/1990 | Yetter | |
| 4,981,152 A | 1/1991 | Laurent | |
| 4,991,895 A | 2/1991 | Artho | |
| 4,995,335 A | 2/1991 | Wright | |
| 5,033,719 A | 7/1991 | Cardente | |
| 5,177,890 A | 1/1993 | Hisatomi | |
| 5,184,800 A | 2/1993 | Tabler | |
| 5,556,080 A | 9/1996 | Vise | |
| 5,557,817 A | 9/1996 | Haddock | |
| 5,701,705 A | 12/1997 | Davis et al. | |
| 5,865,355 A | 2/1999 | Camara | |
| 5,890,244 A * | 4/1999 | Cartwright et al. | ............. 5/663 |
| 6,073,587 A | 6/2000 | Hill et al. | |
| 6,092,792 A | 7/2000 | Camara | |
| 6,450,123 B1 | 9/2002 | Murray et al. | |
| 6,481,926 B2 * | 11/2002 | Benedict et al. | ............... 405/21 |
| 6,719,276 B1 | 4/2004 | Bush | |
| 6,871,614 B2 | 3/2005 | Goldwitz et al. | |
| 2005/0263093 A1 | 12/2005 | Rosen | |

OTHER PUBLICATIONS

Brochure from Priefert Ranch Equipment, 2 pages.
Brochure or catalog from HW Brand Equipment, p. 10.

* cited by examiner

*Primary Examiner*—Son T. Nguyen
(74) *Attorney, Agent, or Firm*—Marian J. Furst (57) ABSTRACT

A cover for a livestock panel to provide shelter from wind and/or block vision through the panel.

12 Claims, 9 Drawing Sheets

LIVESTOCK PANEL COVER

CROSS REFERENCE TO RELATED APPLICATIONS

This application is a continuation-in-part of application Ser. No. 11/291,474 filed on Dec. 1, 2005 now abandoned, entitled "Livestock Panel Cover," which is incorporated herein by reference in its entirety.

FIELD OF THE INVENTION

The present invention relates generally to a cover for a livestock panel or gate, and more particularly to a cover that serves as a wind screen and can be secured over a livestock panel or gate.

BACKGROUND OF THE INVENTION

In the livestock industry, portable panels and gates are often used to create enclosures, such as corrals or pens, for holding horses, cattle, and other animals. These panels and gates are generally formed from steel tubing, with a more or less rectangular frame and horizontal crossbars within the frame. Multiple panels and, generally, a gate, are attached to each other at the sides to form an enclosure. Although the panels are easily transported by a truck or other vehicle and work well to keep the animals confined, they provide little or no protection from wind. Further, during some activities conducted within an enclosure formed by the panels, the animals can become attracted to or distracted by things they see outside the enclosure. Thus, it would be desirable to have a means of providing protection from the wind and preventing the confined animals from seeing what is outside the enclosure.

SUMMARY OF THE INVENTION

To achieve the foregoing and other objects and in accordance with the purpose of the present invention broadly described herein, one embodiment of this invention comprises a livestock panel cover including a front sheet having top, side, and bottom edges, and wherein the side edges include notches for accommodating brackets or hinges extending from a livestock panel; and a back sheet having top, side, and bottom edges having lengths substantially the same as the edges of the front sheet, wherein the side edges include notches for accommodating brackets or hinges extending from a livestock panel. The panel cover also includes means for aligning and joining the front sheet to the rear sheet along the top and side edges and additional means positioned away from said top edges, side edges, and bottom edges for joining central portions of the sheets to each other. The front sheet to the rear sheet along the top and side edges, and the cover is dimensioned to substantially envelop a livestock panel and is operative to block wind.

The means for joining may be selected from seams attaching the front and back sheets to each other, folds between the front and back sheets, and gussets inserted between the sheets. The means for aligning and joining may be adapted for repeatedly joining the front and rear sheets to each other and detaching the front and rear sheets from each other. Further, the means for aligning and detachably joining may be selected from zippers, snaps, buttons, buckles, hook and loop fasteners, ties, lacing systems, and combinations thereof. Also, the additional fastening means may be selected from snaps, buttons, buckles, hook and loop fasteners, ties, lacing systems, and combinations thereof. The livestock panel cover may comprise a fabric with properties selected from flexibility, wind resistance, durability, opacity, weight, and combinations thereof. Further, it may comprise means for joining the front and back sheets along the bottom edges. Preferably, the panel cover is dimensioned to enclose a substantially rectangular livestock panel. The livestock panel cover may further comprise means for attaching additional objects to the panel cover, such as loops, eyelets, and transparent windows. The edges of the front and/or back sheets may be reinforced.

The panel cover may comprise first and second sections, with each section including front and back sheets, and each sheet may have notches along one side edge for accommodating brackets or hinges extending from a livestock panel and a second side edge. Also, the first and second sections are mateable with each other by overlapping the front sheets and the back sheets. The panel cover may further comprise means for securing the sections to each other. The means for securing may be selected from zippers, snaps, buttons, buckles, hook and loop fasteners, ties, lacing systems, and combinations thereof.

Another embodiment of the present invention comprises a covered livestock panel, including a livestock panel comprising a frame and brackets extending outward from the frame, at least one front sheet, and at least one rear sheet joined to the front sheet along edges of the sheets to substantially enclose the livestock panel, wherein the brackets extend outside the enclosure. The sheets are also joined to each other at positions spaced away from the top, side, and bottom edges of the sheets. In addition, the covered panel may comprise fastening means, such as zippers, snaps, buttons, buckles, hook and loop fasteners, ties, lacing systems, and combinations thereof, for securing the front sheet to the rear sheet to enclose the frame and rails of a livestock panel.

Yet another embodiment of the present invention comprises a method for covering a livestock panel. One step in the method includes providing a livestock panel having a frame and brackets extending from the frame for joining the panel to another panel. Another step includes providing a livestock panel cover dimensioned to fit over the livestock panel and comprising a front sheet having top, side, and bottom edges, and wherein the side edges include notches for accommodating brackets or hinges extending from a livestock panel; a back sheet having top, side, and bottom edges having lengths substantially the same as the edges of the front sheet, wherein the side edges include notches for accommodating brackets or hinges extending from a livestock panel; means for joining the front sheet to the rear sheet along one of the edges; and means for aligning and joining the front sheet to the rear sheet along other edges. Other steps include placing the livestock panel cover over the livestock panel with the front sheet and the rear sheet on opposing sides of the livestock panel and joining the front sheet to the rear sheet along at least the top and side edges of the sheets to enclose the livestock panel. The method may also include the step of joining the front sheet to the rear sheet at positions away from the edges and between rails of the livestock panel.

BRIEF DESCRIPTION OF THE DRAWINGS

These and other features, aspects, and advantages of the present invention will become better understood with reference to the following description, appended claims, and accompanying drawings, where:

FIG. 5b shows a panel cover in accordance with the invention installed on the panel of FIG. 5a;

DESCRIPTION OF THE INVENTION

Figures 1, 2:
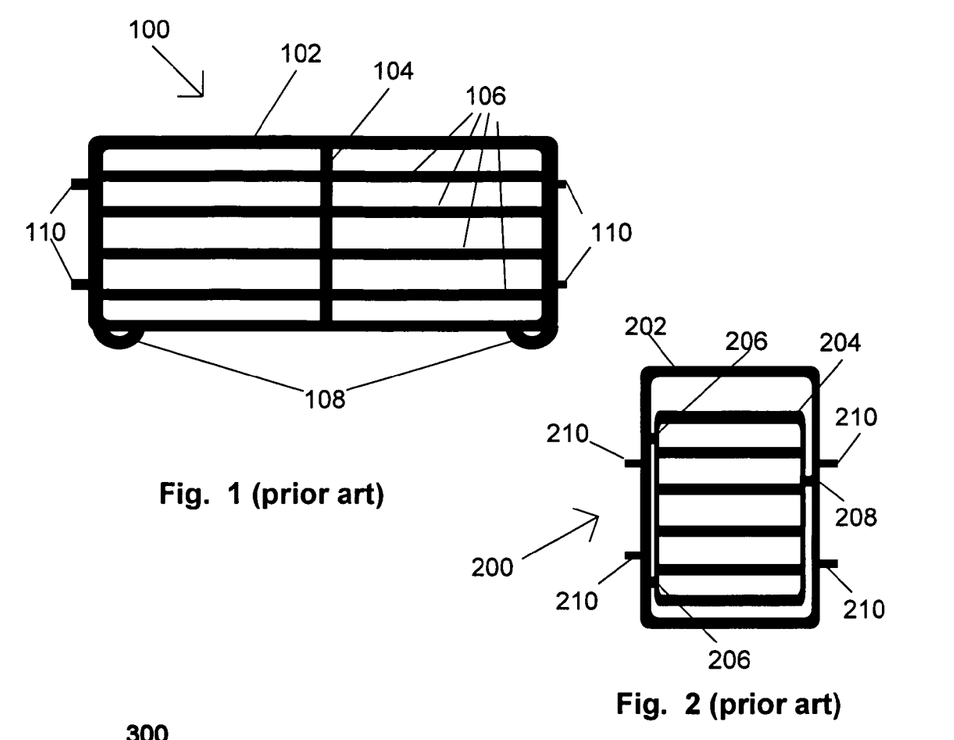
FIG. 1 is a front view of a prior art livestock panel.
FIG. 2 is a front view of a prior art corral gate.
Figure 3:
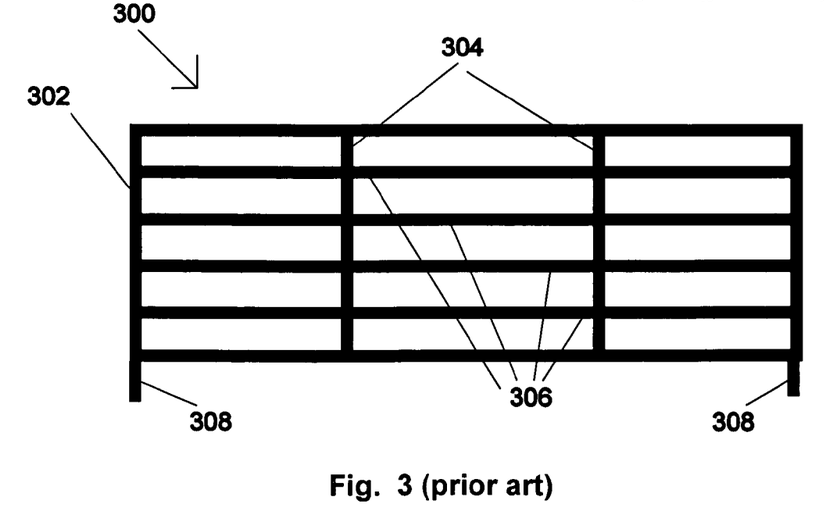
FIG. 3 is a front view of another prior art livestock panel.

The present invention comprises a livestock panel cover, usable, for example with standard, commercially available livestock panels and gates such as those shown in FIGS. 1-3. Panel 100 comprises an approximately rectangular frame 102 with rounded corners. Vertical reinforcing member 104 and horizontal crossbars 106 are welded onto the frame 102. Frame 102 rests on supports 108, and brackets 110 extend outward from frame 102 to accommodate a hinge pin or other means of joining adjacent panels to each other. Gate 200 has a support frame 202 with side brackets 210 for joining the frame to adjacent panels, such as panels 100. Door 204 is mounted within frame 202 on hinges 206, and it includes a latch 208 for securing the door in a closed position. Panel 300 has a rectangular frame 302 with sharper corners, and horizontal and vertical members 304 and 306, respectively. Legs 308 extend downward from the sides of frame 302.

As used herein, the terms "side," "top," and "bottom" refer to the orientation of the panel cover as positioned on a fence panel. Thus, the top of the panel cover would be placed over the top of the panel, the sides of the panel cover would be placed about the sides of the panel, and the bottom of the panel cover would be adjacent the bottom of the fence panel. It is assumed that the fence panel is installed in the normal orientation. Also as used herein, the term "livestock" refers to large animals, such as horses, cattle, bison, hogs, sheep also? etc. Thus, the livestock panels used to form an enclosure for such animals must be of sturdy construction.

Figure 4A:
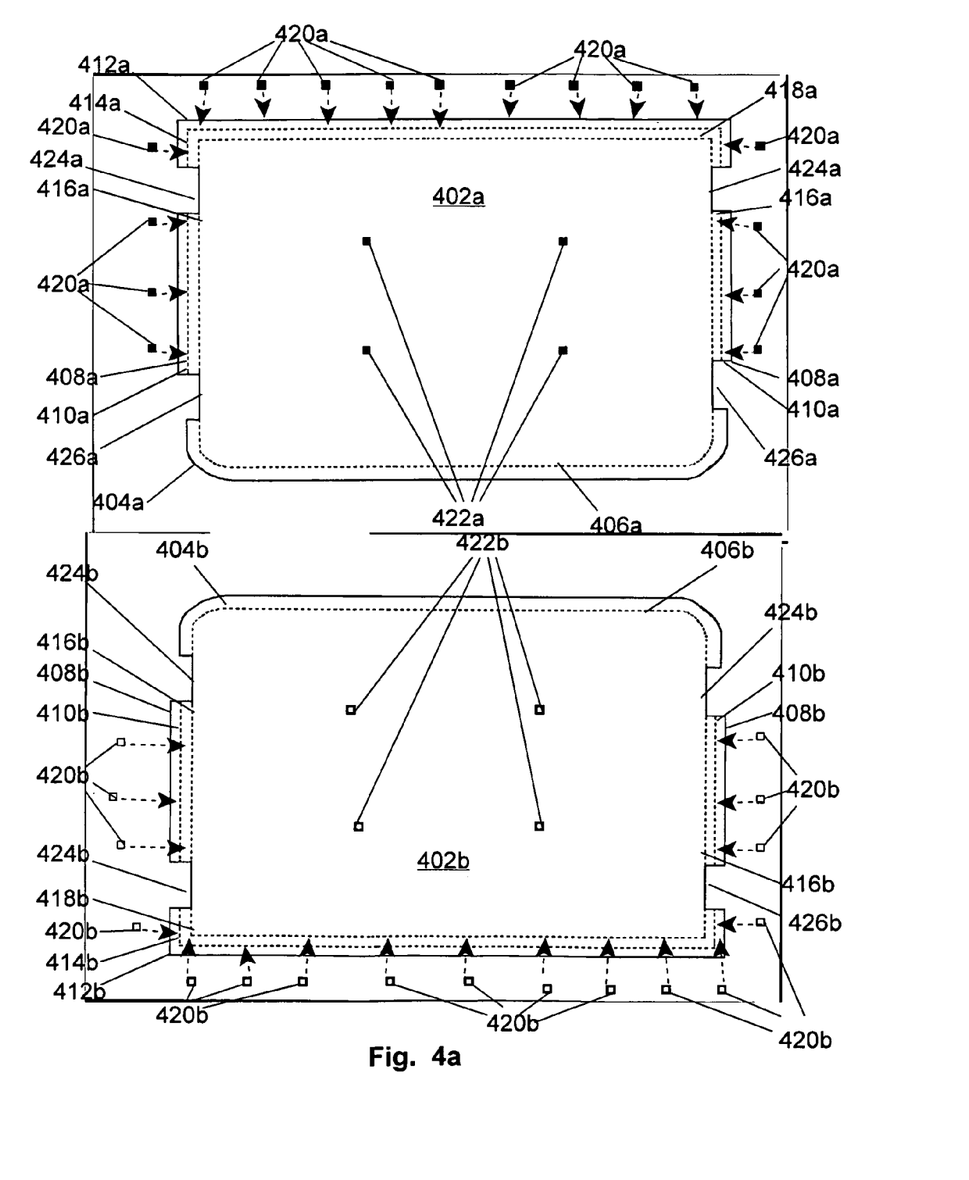
FIG. 4a is a front view of two pieces of fabric cut for assembly into a panel cover in accordance with the present invention.
Figure 4B:
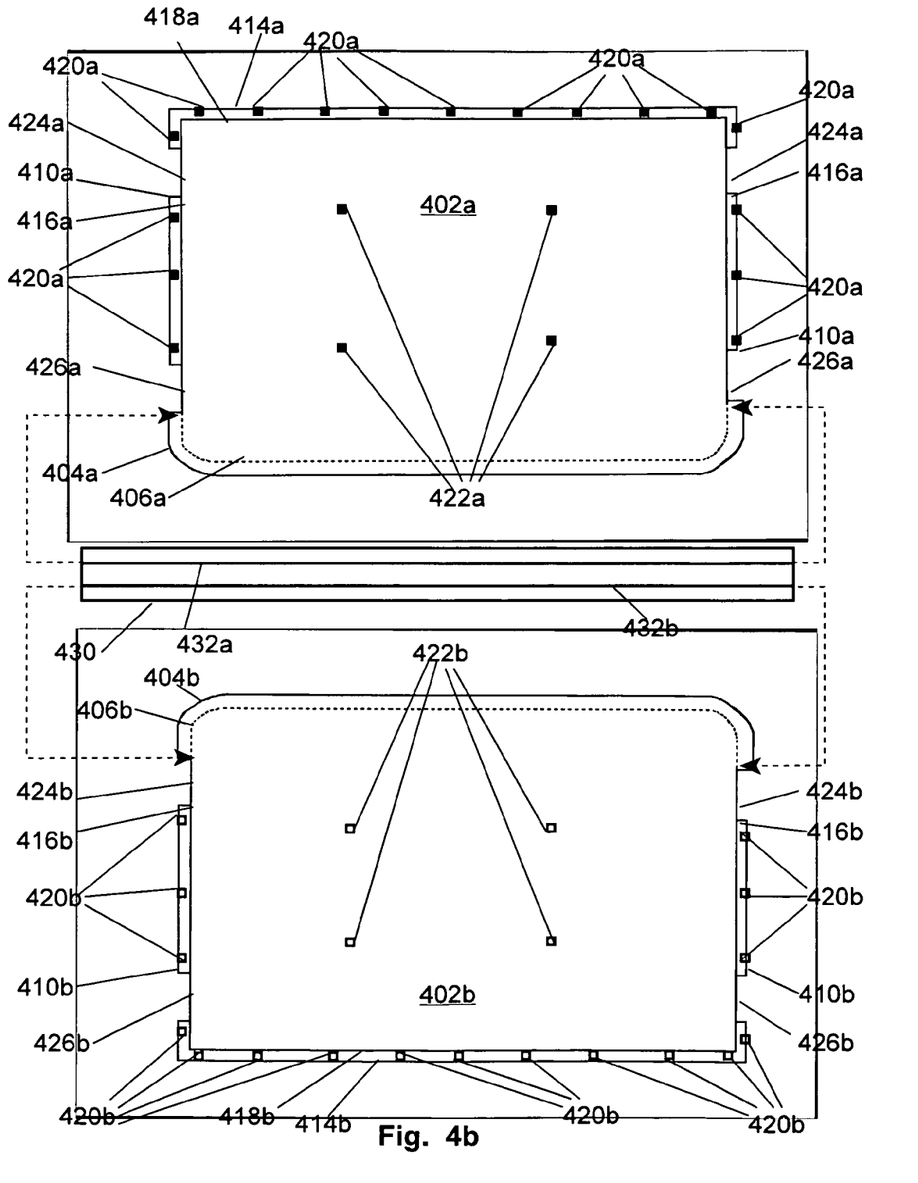
FIG. 4b is a front view showing a partially assembled panel cover in accordance with the present invention.
Figure 4C:
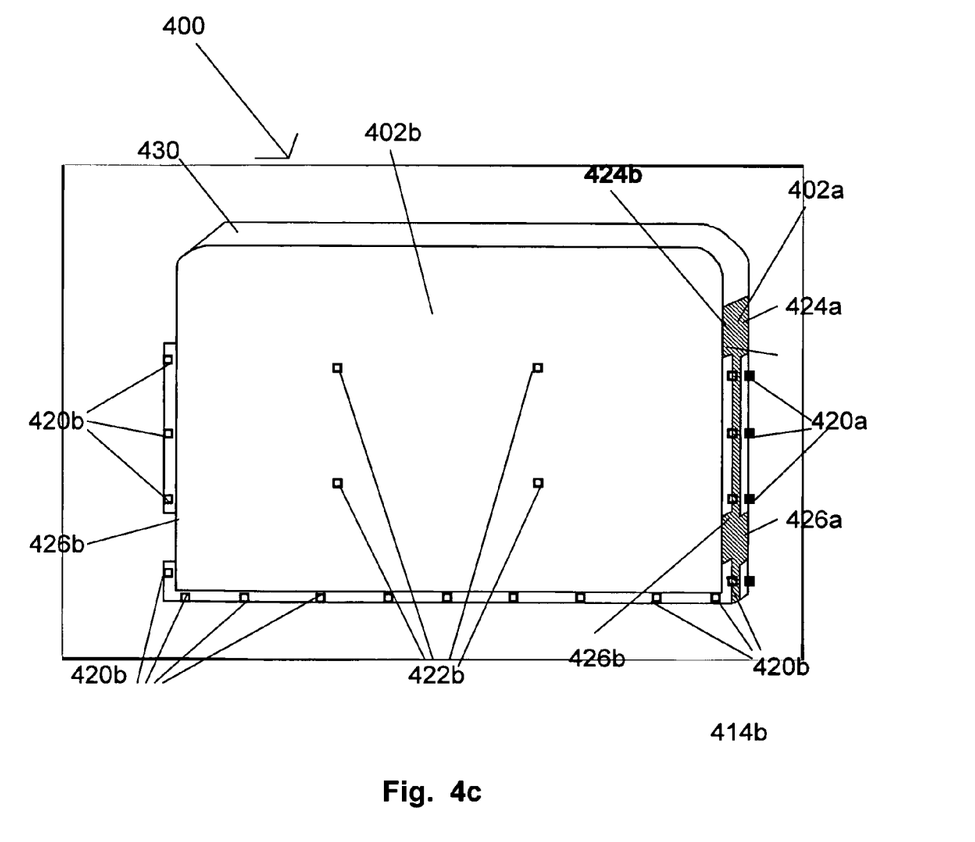
FIG. 4c shows an assembled panel cover in accordance with the present invention.

Assembly of a panel cover in accordance with the present invention can be understood with reference to FIG. 4. Panel cover 400, shown in FIG. 4c, is formed from two sheet-like wall portions 402a and 402b, sized to fit over a livestock panel. Each wall portion has a top seam allowance 404a or 404b extending upward from top seam line 406a or 406b, side tabs 408a or 408b with fold lines 410a or 410b along the side edges, and bottom tab 412a or 412b with fold line 414a or 414b along the bottom edge. Stitching lines 406a, 406b, 416a, 416b, 418a, and 418b are spaced inward from the top, side, and bottom edges, respectively.

Side tabs 408a and 408b are folded along fold lines 410a and 410b, respectively, and stitched along stitching lines 416a and 416b. Similarly, the bottom tabs 412a and 412b are folded along fold lines 414a and 414b and stitched along stitching line 418a and 418b, respectively. Each wall portion 402a and 402b is provided with fasteners, such as snaps having male parts 420a and mating female parts 420b. As shown in FIGS. 4a-c, male parts 420a are mounted onto the folded tabs 410a and 412a of wall portion 402a, and female snap parts 420b are mounted onto the folded tabs 410b and 412b of wall portion 402b. It should be understood that the purpose of folding tabs 410a, 410b, 412a, and 412b is to provide reinforced edges for mounting snap parts 420a and 420b to the wall portions 402a and 402b of the panel cover. Notches 424a, 424b, 426a, and 426b are positioned to provide openings around brackets extending from a panel on which the panel cover 400 is mounted.

Referring to FIGS. 4b and 4c, gusset 430 is attached to wall portions 402a and 402b by matching seam line 406a with seam line 432a and seam line 406b with seam line 432b. The gusset may be attached to the wall portions by stitching, heat sealing, bonding, or any other means known in the art that will provide a sturdy seam. It may be desirable to further reinforce the seam with an enclosed cord or piping (not shown). As shown, gusset 430 extends downward from the top of the panel cover to the tops of the notches 424a and 424b. The interior surface of wall portion 402a is shaded. Mateable snaps 420a and 420b are aligned with each other along the side and bottom edges of panel cover 400. Mateable snaps 422a and 422b are aligned with each other for attaching the wall portions 402a and 402b to each other when the panel is in use to prevent billowing of the wall portions in the wind.

Figure 5A:
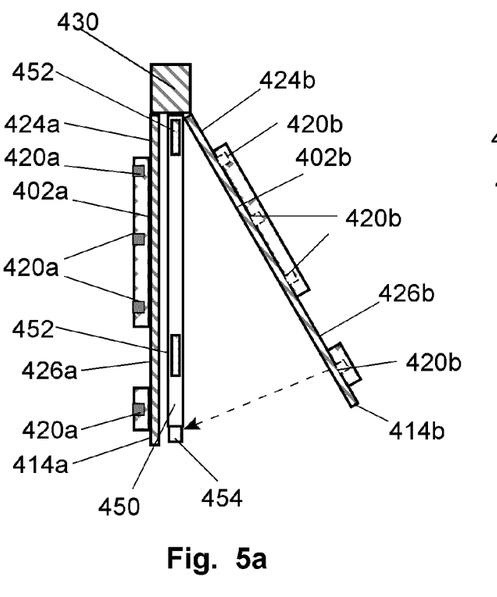
FIG. 5a shows the installation of a panel cover in accordance with the present invention onto a panel, viewed from the end of the panel.
Figure 5B:
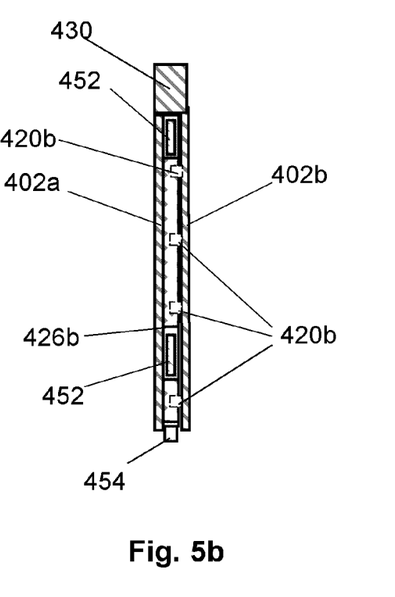

Panel cover 400 can be installed onto panel 450 as illustrated in FIG. 5. Gusset 430 fits over the top of the panel frame 450. Male snap parts 420a are joined with aligned female snap parts 420b along the sides and bottom of the panel 450, with notches 424a and 424b and 426a and 426b, respectively, forming openings to accommodate brackets 452 extending outward from the sides of panel 450. As shown, the edges of wall portion 402b overlap the edges of wall portion 402a, with male snap parts 420a (hidden) facing toward female snap parts 420a (also hidden and indicated with dashed lines). At the bottom of the panel 450, supports 454 extend downward between the joined bottom edges of wall portions 402a and 402b.

Figure 6:
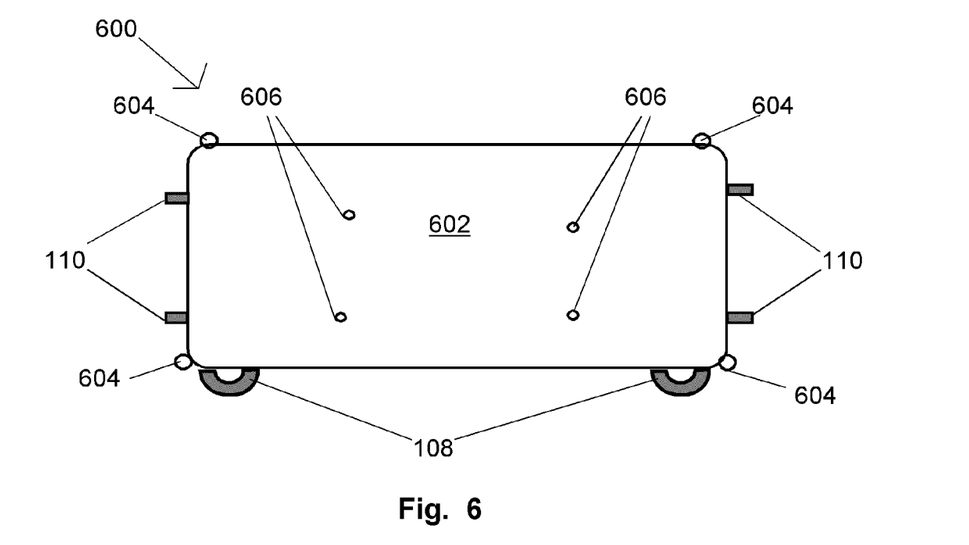
FIG. 6 is a front view of another panel cover in accordance with the present invention mounted on the panel of FIG. 1.

Referring to FIG. 6, another embodiment of a livestock panel cover 600 in accordance with the present invention fits over a panel such as panel 100 to provide a wall-like structure. Panel cover 600 comprises two sheets of fabric 602 that fit over panel 100 in an envelope-like manner, with openings to accommodate brackets 110 and supports 108. Loops or eyelets 604 can be used to attach various objects to the panel cover. For example, the eyelets could be used to tie down a cover over an arena formed from several covered panels. Alternatively, a banner could be tied to the front of panel cover 600. Fasteners 606 secure the front and back panels together between the reinforcing member 104 and horizontal crossbars 106 of panel 100.

Figure 7:
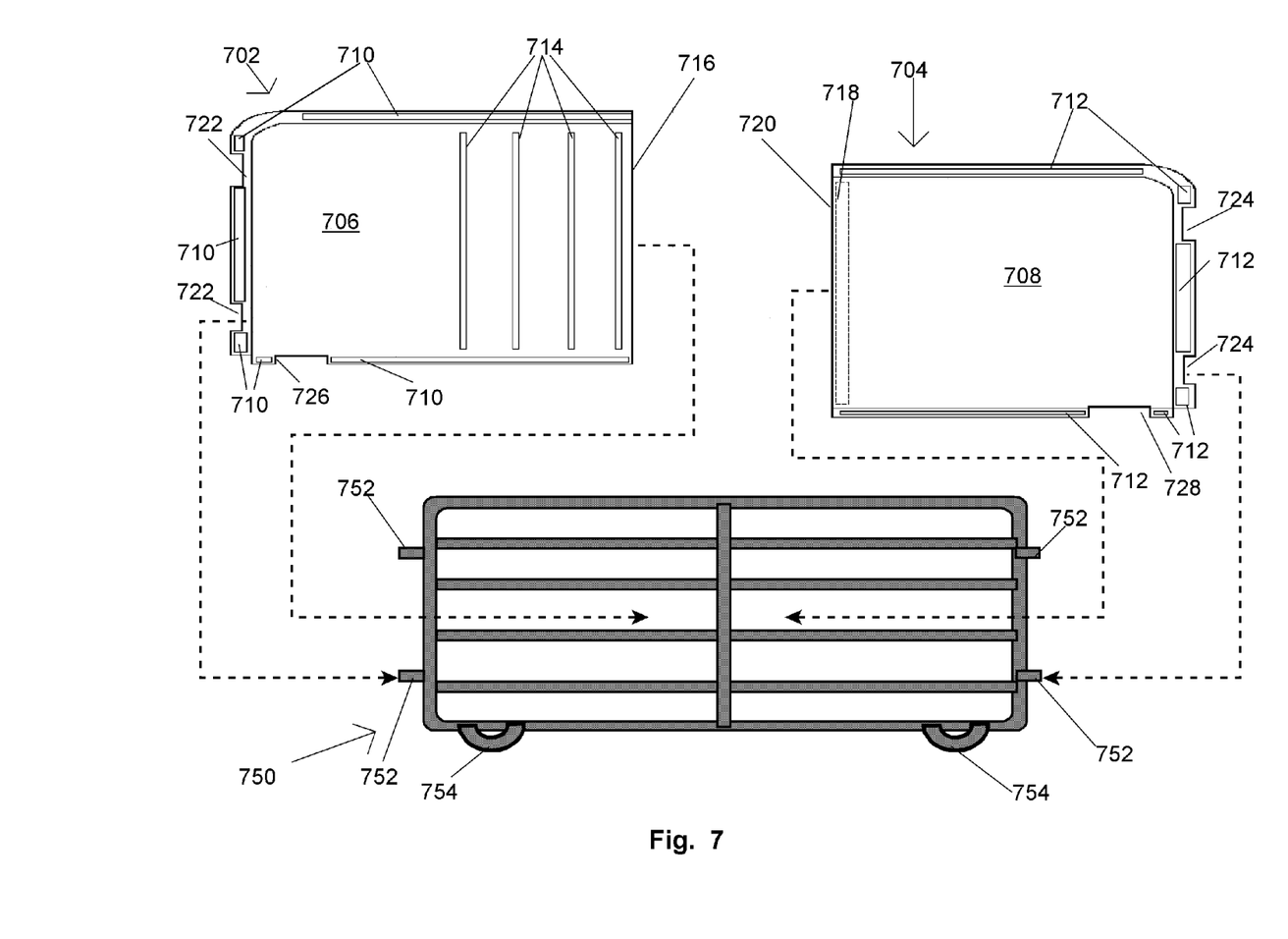
FIG. 7 is a front view showing the installation of yet another panel cover in accordance with the present invention on another panel.
Figure 8:
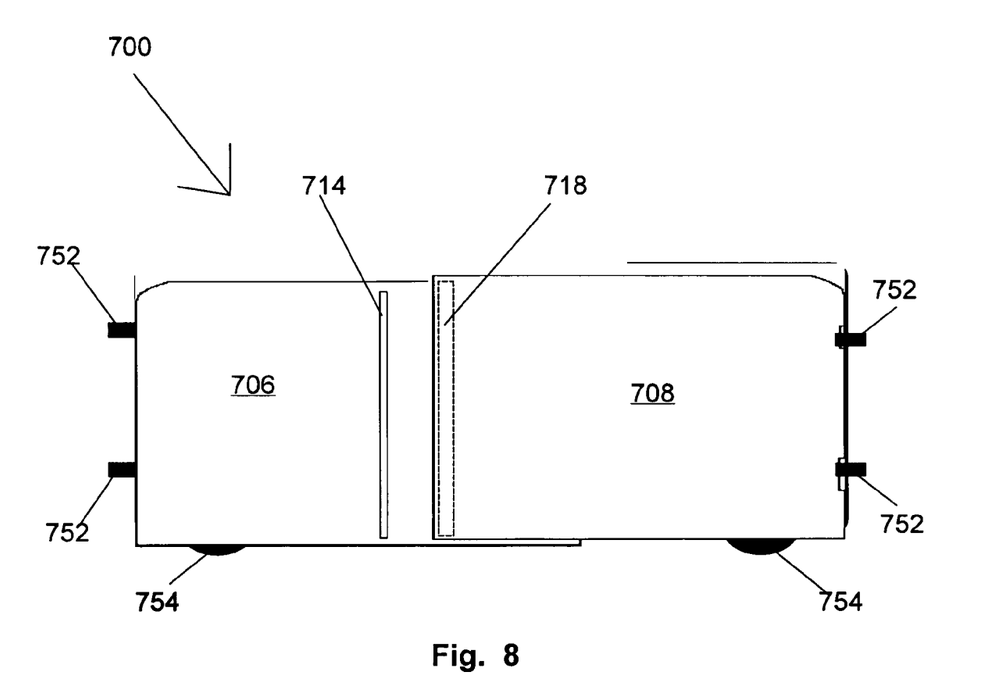
FIG. 8 is a front view of the panel cover of FIG. 7 installed on the panel.

Another embodiment of the present invention may be understood with reference to FIGS. 7 and 8. Panel cover 700 includes two partial covers 702 and 704. Each partial cover includes two wall portions 706 and 708 with fastening means 710 and 712 at the top, bottom, and side edges to secure the wall portions to each others. As shown, fastening means 710 and 712 are hook and loop fasteners, such as Velcro®. Additional strips 714 of loop fastener are mounted onto partial cover 702 at positions spaced from the edge 716. A mateable strip of hook fastener 718 is attached to the reverse side of partial cover 704 adjacent edge 720.

As shown in FIG. 8, the partial panel covers 702 and 704 can be mounted onto a panel, such as panel 750, with the edges joined about openings 722, 724, 726, and 728 through which brackets 752 and supports 754 extend. Depending on the width of the panel, hook fastener strip 718 is pressed onto one of loop fastener strips 714 to provide a panel cover having a width approximately the same as that of the panel on which it is mounted.

Figure 9:
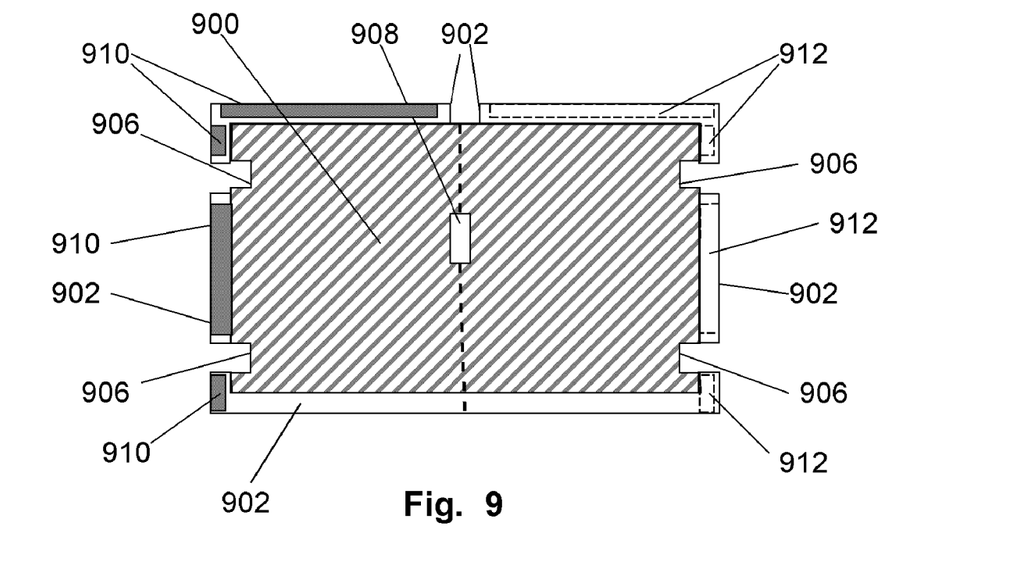
FIG. 9 is a view of the exterior surface of another panel cover in accordance with the present invention for use with a gate of the type shown in FIG. 2.
Figure 10:
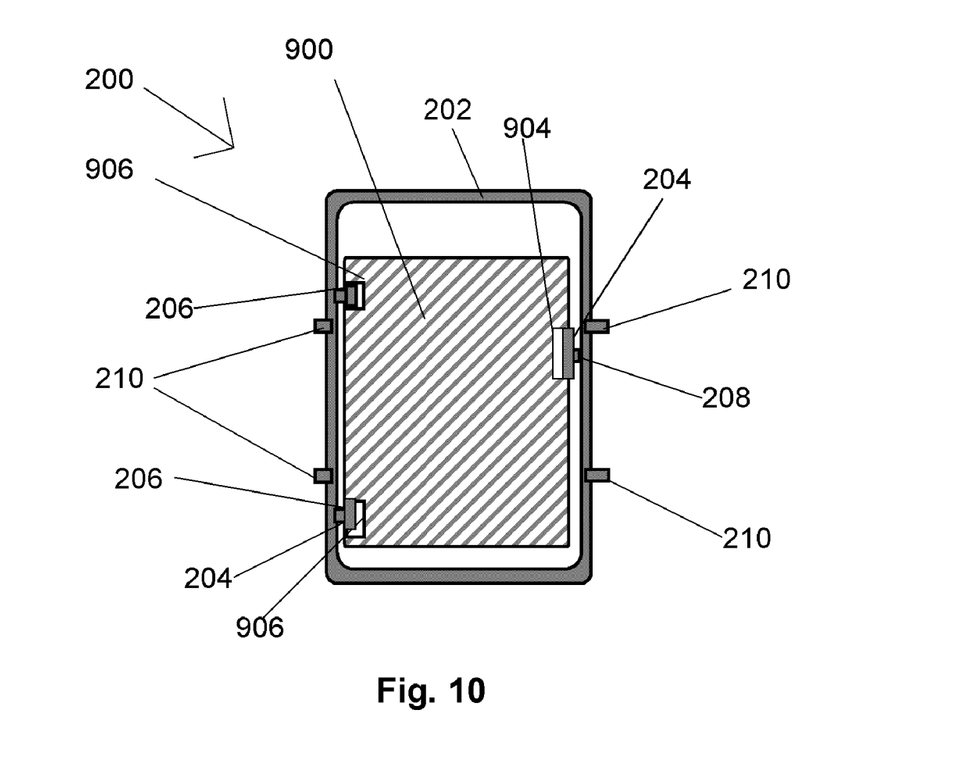
FIG. 10 is a front view of the panel cover of FIG. 9 installed on the gate.

Panel covers in accordance with the present invention can be shaped to fit onto any size panel or gate. For example, panel cover 900 fits onto gate 204, as shown in FIGS. 9-10. Openings 902 at the sides of panel cover 900 are sized and positioned around hinges 206 and latch 208. Panel cover 900 comprises a sheet of flexible material with reinforced edges 902. Notch 904 is provided adjacent the center of the top edge, and notches 906 are provided along the side edges at locations selected to fit over gate hinges 206 when the cover is mounted on gate 200. Opening 908 is positioned to fit over gate latch 204. Loop fastener material 910 is attached along the edges 902 on one half of panel cover 900 on the surface facing toward the viewer, and hook fastener material 912 is attached to the back side of the panel cover, facing away from the viewer.

To install panel cover 900 on gate 200, the gate is first opened. Then panel cover 900 is positioned adjacent gate 200 with opening 908 over the gate latch 204. Next, panel cover 900 is folded around gate 200, and the top and side edges are secured by pressing the loop fastener material patches 910 and the corresponding hook fastener material patches 912 together, with edges 902 overlapping each other along the top and sides of the gate 200. The panel cover can be easily removed by pulling the hook and loop fastener patches apart and sliding the cover off of latch 204.

Figure 11:
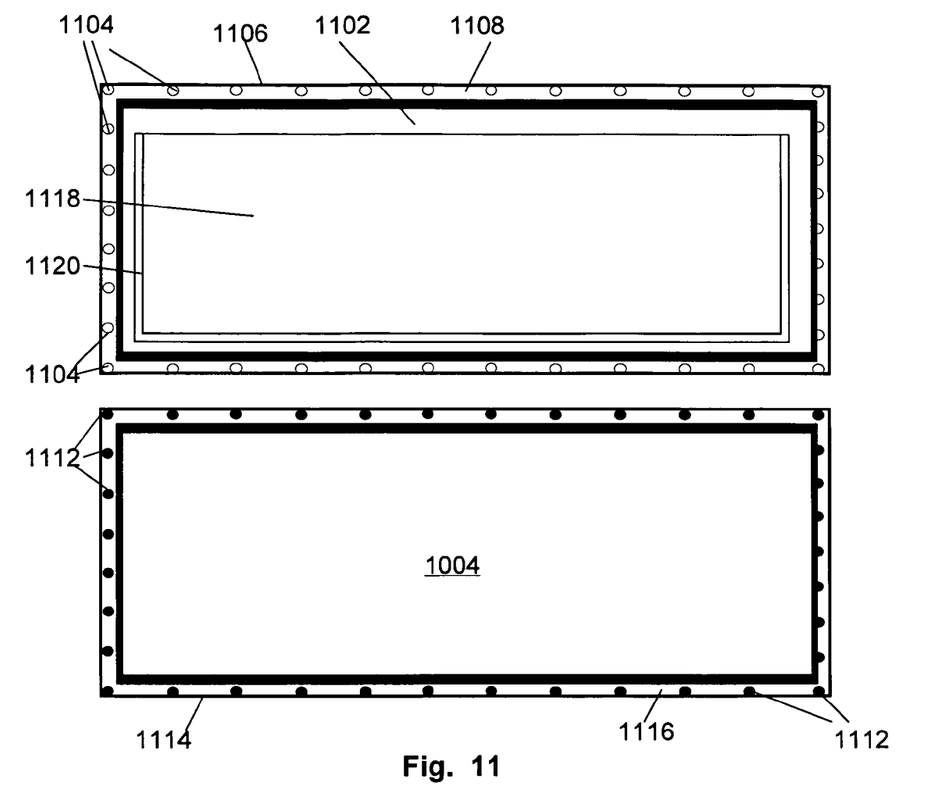
FIG. 11 is a front view of two sheet portions of yet another panel cover in accordance with the present invention.
Figure 12:
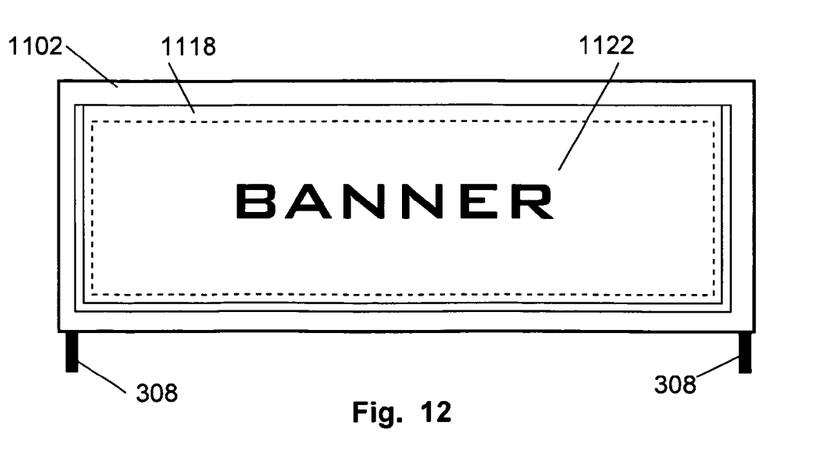
FIG. 12 is a front view of the panel cover of FIG. 11 installed on a livestock panel of the type shown in FIG. 3.

Another embodiment 1100 of the present invention, suitable for use with panels of the type shown in FIG. 3, is shown in FIGS. 11 and 12. Sheet 1102 has female fasteners 1104 mounted adjacent edges 1106, which are preferably reinforced with reinforcement strips 1108. Sheet 1110 has male fasteners 1112 mounted adjacent edges 1114, which are also preferably reinforced with strips 1116. A transparent pocket 1118 is mounted onto the outer surface of sheet 1102, such as by stitching or bonding the side and bottom edges 1120 to sheet 1102. Optionally, a second transparent window (not shown) can be mounted to panel 1104. To enclose panel 300, sheet 1102 is paired with sheet 1110 by mating female fasteners 1104 with corresponding male fasteners 1112 along the edges to enclose the frame of panel 300, as shown in FIG. 12. Legs 308 extend between the mated fasteners. A banner 1122 has been inserted between transparent pocket 1118 and the outer surface of sheet 1102. The banner could be used to provide relevant information or advertising.

The panel cover of the present invention is preferably lightweight, flexible, and easily foldable to facilitate transportation by automobile or pick-up truck and for compact storage when not in use. In addition to facilitating transportation, installation, de-installation, and storage of the panel cover, the flexibility also ensures safety for any animals. It is undesirable to use any stiff material that has sharp edges or can break or tear during use to form sharp edges that could cut an animal coming in contact with the sheet or torn part of the sheet. The panel cover can be made from any suitable fabric that has adequate durability, flexibility, wind-resistance, opacity, water-tightness, and weight for the intended use. Examples of such fabrics include canvas, nylon, plastic sheeting, and plastic coated woven fabrics. Preferably, the panel cover is water-tight, providing additional shelter during stormy weather and also avoiding damage from mildew and frost. Despite its light weight and flexibility, the panel cover is suitable for every-day use with livestock because it is supported by the enclosed livestock panel. Depending on the material and type of fasteners used, the panel cover may be inexpensive to manufacture. For example, snaps can be mounted on plastic sheeting to produce panel covers at low cost.

The panel cover in accordance with the present invention need not be shaped to fit precisely about a panel, surrounding or enveloping the panel or gate in a manner similar to an envelope enclosing a letter. It should be noted that the fasteners secure one portion of the panel cover to another portion of the panel cover and do not attach the panel cover directly to or engage with the panel frame or crossbars. Because the panel covers envelops the entire panel, it can be used with panels having different vertical spacings between the crossbars. The corners of the panel cover may be more square or more rounded, depending on the shape of the panel on which it is to be mounted. The positions of the fasteners and the notches should be selected to accommodate brackets, hinges, latches, bottom supports, etc. that extend outward from the frame of the panel or gate. Preferably, the panel cover is shaped to fit closely over a livestock panel or gate. As described with reference to FIGS. 4 and 5, the panel cover may have a gusset across the top, or it could be simply folded over the top or side of a panel, as described with reference to FIGS. 9 and 10. Alternatively, the tops of the panel walls may be fastened directly to each other, as described with reference to FIGS. 11 and 12.

Although snaps are shown in FIGS. 4, 5, 11, and 12, and hook and loop fasteners, such as Velcro®, are shown in FIGS. 7, 8, and 9, any type of suitable fasteners known in the art can be used to secure the edges of the panel cover about a panel. Examples of other types of fasteners include zippers; buttons; buckles; ties; lacing systems, e.g., grommets and laces; hooks and eyes; and combinations thereof.

Any number of fasteners may be used at interior positions spaced away from the edges of the panel cover walls to join the walls to each other, thus preventing the panel cover from billowing in the wind. The number and placement of these additional fasteners may be determined based on the type of fabric used, the size of the panel, the spacing of any vertical and horizontal members within the panel frame, and the environment in which the panel cover is to be used.

Although the embodiment of FIGS. 4 and 5 was described with edges that are folded for reinforcement, and the embodiment of FIGS. 11 and 12 has edges to which reinforcing tape has been applied, other methods of reinforcement could be used. For example, any edges or seams, such as the seams between gusset 430 and walls 402*a* and 402*b*, may be reinforced with enclosed cord, cable, or piping.

Although the panel cover is intended primarily as a wind barrier or wind screen, it may be desirable to include ornamentation, for example, a pattern or other design such as an advertising logo or text. Optionally, one or both of the exterior wall surfaces can be provided with means for displaying information or advertising. For example, transparent pockets may be attached to the exterior walls to accommodate posters or banners, or the walls may include Velcro, eyelets, or other means for fastening posters or banners to the wall.

Panels enclosed by panel covers in accordance with the present invention may be used to convert a pen with open sides into a stall or to convert a corral with open sides to an arena. The panel covers are primarily intended for use as wind-breaks to provide comfort for the enclosed livestock and/or for people working with the livestock. However, the covers also may be used to limit the view of animals within an enclosure and prevent distraction by objects and events outside the disclosure, or to limit the view from the exterior of an enclosure into the interior. Further, the panel covers may be used to provide information or advertising to people nearby.

The foregoing description is considered as illustrative only of the principles of the invention. Further, since numerous modifications and changes will readily occur to those skilled in the art, it is not desired to limit the invention to the exact construction and process shown and described above. Accordingly, all suitable modifications and equivalents may be resorted to falling within the scope of the invention.

What is claimed is:

1. A wind screen for a livestock panel, comprising: a livestock panel;
    a front sheet having top, side, and bottom edges and wherein said side edges include notches for accommodating brackets or hinges extending from said livestock panel;
    a rear sheet having top, side, and bottom edges having lengths substantially the same as the edges of said front sheet, wherein said side edges include notches for accommodating brackets or hinges extending from said livestock panel;
    means for aligning and joining said front sheet to said rear sheet along said top and side edges; and
    additional fastening means positioned substantially in central areas of said front and rear sheets away from said top edges, side edges, and bottom edges for joining central portions of said front and rear sheets to each other;
wherein said wind screen is dimensioned to substantially envelop said livestock panel and is operative to block wind; said front and rear sheets comprising fabric with properties selected from flexibility, wind resistance, durability, opacity, weight, and combinations thereof.

2. The livestock wind screen of claim 1, wherein said means for joining is selected from seams attaching said front and rear sheets to each other, folds between said front and rear sheets, and gussets inserted between said sheets.

3. The livestock wind screen of claim 1, wherein said means for aligning and joining is adapted for repeatedly joining said front and rear sheets to each other and detaching said front and rear sheets from each other.

4. The livestock wind screen of claim 3, wherein said means for aligning and detachably joining is selected from zippers, snaps, buttons, buckles, hook and loop fasteners, ties, lacing systems, and combinations thereof.

5. The livestock wind screen of claim 1, wherein said additional fastening means are selected from snaps, buttons, buckles, hook and loop fasteners, ties, lacing systems, and combinations thereof.

6. The livestock wind screen of claim 1, wherein:
    said wind screen comprises first and second sections, each section including front and rear sheets with each sheet having notches along one side edge for accommodating brackets or hinges extending from said livestock panel and a second side edge;
    each of said sections comprises additional fastening means positioned away from said top edges, side edges, and bottom edges for joining central portions of said front and rear sheets to each other;
    said first and second sections are mateable with each other by overlapping said front sheets and said rear sheets; and
    said wind screen further comprises means for securing said sections to each other.

7. The livestock wind screen of claim 6, wherein said means for securing is selected from zippers, snaps, buttons, buckles, hook and loop fasteners, ties, lacing systems, and combinations thereof.

8. The livestock wind screen of claim 1, additionally comprising means for joining said front and rear sheets along said bottom edges.

9. The livestock wind screen of claim 1, wherein said wind screen is dimensioned to envelop a substantially rectangular livestock panel.

10. The livestock wind screen of claim 1, further comprising means for attaching additional objects to said wind screen.

11. The livestock wind screen of claim 10, wherein said means for attaching is selected from loops, eyelets, and transparent windows.

12. The livestock wind screen of claim 1, wherein at least some of said edges are reinforced.

* * * * *